(12) United States Patent
Kim et al.

(10) Patent No.: US 7,879,971 B2
(45) Date of Patent: Feb. 1, 2011

(54) MULTIBLOCK COPOLYMER, METHOD OF PREPARING THE SAME, POLYMER ELECTROLYTE MEMBRANE PREPARED FROM THE MULTIBLOCK COPOLYMER, METHOD OF PREPARING THE POLYMER ELECTROLYTE MEMBRANE, AND FUEL CELL EMPLOYING THE POLYMER ELECTROLYTE MEMBRANE

(75) Inventors: Hae-kyoung Kim, Yongin-si (KR); Won-mok Lee, Yongin-si (KR); Hyuk Chang, Yongin-si (KR); Jin Chul Jung, Yongin-si (KR); Sam Dae Park, Yongin-si (KR); Yun Ju Chang, Yongin-si (KR)

(73) Assignee: Samsung SDI, Co., Ltd., Gyeonggi-do (KR)

( * ) Notice: Subject to any disclaimer, the term of this patent is extended or adjusted under 35 U.S.C. 154(b) by 844 days.

(21) Appl. No.: 11/656,375

(22) Filed: Jan. 23, 2007

(65) Prior Publication Data

US 2007/0218336 A1    Sep. 20, 2007

(30) Foreign Application Priority Data

Mar. 16, 2006 (KR) ............... 10-2006-0024272

(51) Int. Cl.
*C08G 75/20* (2006.01)
(52) U.S. Cl. .................. 528/391; 429/33; 521/27; 521/33; 528/364

(58) Field of Classification Search ............ 528/391, 528/364; 521/27, 33; 429/33
See application file for complete search history.

(56) References Cited

U.S. PATENT DOCUMENTS 4,327,203 A * 4/1982 Deichert et al. ............. 526/279

(Continued)

FOREIGN PATENT DOCUMENTS

CN    1743059 A    3/2006

(Continued)

OTHER PUBLICATIONS

Mecham et al., Polymer Preprint, vol. 41(2), pp. 1388-1389 (2000).*

(Continued)

*Primary Examiner*—Peter D. Mulcahy
*Assistant Examiner*—Henry Hu
(74) *Attorney, Agent, or Firm*—Lee & Morse, P.C.

(57) ABSTRACT

A multiblock copolymer includes a polysulfone repeating unit, a sulfonated polysulfone repeating unit, a polydialkyl-siloxane repeating unit and an ethylenic unsaturated group at a terminal of the multiblock copolymer. Also provided are a method of preparing the multiblock copolymer, a polymer electrolyte membrane prepared from the multiblock copolymer, a method of preparing the polymer electrolyte membrane, and a fuel cell including the polymer electrolyte membrane. The polymer electrolyte membrane that has a high ionic conductivity and good mechanical properties and minimizes crossover of methanol can be manufactured at low cost. In addition, the structure of the multiblock copolymer can be varied to increase selectivity to a solvent used in a polymer electrolyte membrane.

11 Claims, 5 Drawing Sheets

U.S. PATENT DOCUMENTS

| | | | |
|---|---|---|---|
| 5,857,992 A * | 1/1999 | Haak et al. | 604/20 |
| 6,248,469 B1 * | 6/2001 | Formato et al. | 429/41 |
| 6,761,989 B2 | 7/2004 | Terahara et al. | |
| 7,038,004 B2 * | 5/2006 | Chen et al. | 528/86 |
| 2003/0219640 A1 | 11/2003 | Nam et al. | |
| 2004/0131909 A1 | 7/2004 | Soczka-Guth et al. | |
| 2006/0154126 A1 | 7/2006 | Ritts et al. | |
| 2008/0275146 A1 | 11/2008 | McGrath et al. | |

FOREIGN PATENT DOCUMENTS

| | | |
|---|---|---|
| EP | 0 790 658 A2 | 8/1997 |
| JP | 9-245818 A | 9/1997 |
| JP | 11-273695 A | 10/1999 |
| JP | 2001-250567 | 9/2001 |
| JP | 2004-131662 A | 4/2004 |
| JP | 2005-171086 A | 6/2005 |
| JP | 2005-203259 | 7/2005 |
| WO | WO 2004/055927 A2 | 7/2004 |

OTHER PUBLICATIONS

"Selectively sulfonated poly(aryl ether sulfone)-b-polybutadlene for proton exchange membrane", Xingpeng Zhang et al., Journal of Polymer Science Part B: Polymer Physics, vol. 44, Issue 4, pp. 665-672, Jan. 5, 2006.*

Japanese Office Action dated Sep. 29, 2009.

* cited by examiner

MULTIBLOCK COPOLYMER, METHOD OF PREPARING THE SAME, POLYMER ELECTROLYTE MEMBRANE PREPARED FROM THE MULTIBLOCK COPOLYMER, METHOD OF PREPARING THE POLYMER ELECTROLYTE MEMBRANE, AND FUEL CELL EMPLOYING THE POLYMER ELECTROLYTE MEMBRANE

CROSS-REFERENCE TO RELATED APPLICATIONS

This application claims the benefit of Korean Patent Application No. 2006-24272, filed on Mar. 16, 2006, in the Korean Intellectual Property Office, the disclosure of which is incorporated herein in its entirety by reference

BACKGROUND OF THE INVENTION

1. Field of the Invention

Aspects of the present invention relate to a multiblock copolymer including a polysulfone repeating unit, a sulfonated polysulfone repeating unit, and a polydialkylsiloxane repeating unit, a method of preparing the multiblock copolymer, a polymer electrolyte membrane prepared from the multiblock copolymer, a method of preparing the polymer electrolyte membrane, and a fuel cell employing the polymer electrolyte membrane. In particular, aspects of the present invention relate to a multiblock copolymer that has a high ionic conductivity, high hydrophobicity, and good mechanical properties and that has various structures to increase its selectivity to a solvent used in a polymer electrolyte membrane. Aspects of the present invention also relate to a method of preparing the multiblock copolymer, a polymer electrolyte membrane prepared from the multiblock copolymer, a method of preparing the polymer electrolyte membrane, and a fuel cell including the polymer electrolyte membrane.

2. Description of the Related Art

Fuel cells can be classified into polymer electrolyte membrane fuel cells (PEMFCs), phosphoric acid fuel cells (PAFCs), molten carbonate fuel cells (MCFCs), solid oxide fuel cells (SOFCs), etc., according to the type of electrolyte used in the fuel cell. The working temperature and constituent materials of fuel cells vary according to the type of electrolyte used in a cell.

According to how fuel is supplied to the anode, fuel cells can be classified into an external reformer type, where fuel is supplied to the anode after being converted into a hydrogen-rich gas by an external reformer, and an internal reformer type or direct fuel supply type where fuel in a gaseous or liquid state is directly supplied to the anode.

A representative example of a direct liquid fuel cell is a direct methanol fuel cell (DMFC). DMFCs use an aqueous methanol solution as fuel and a proton exchange polymer membrane with ionic conductivity as an electrolyte. (Therefore, a DMFC may also be a PEMFC) DMFCs are small and lightweight, but can achieve a high output density. In addition, an energy generating system having a simpler structure can be manufactured using PEMFCs.

A basic structure of a PEMFC includes an anode (fuel electrode), a cathode (oxidant electrode), and a polymer electrolyte membrane disposed between the anode and the cathode. A catalyst layer for facilitating the oxidation of fuel is formed on the anode of the PEMFC, and a catalyst layer for facilitating the reduction of an oxidant is formed on the cathode of the PEMFC.

In the anode of the PEMFC, proton ions and electrons are generated as a result of the oxidation of fuel. The proton ions migrate to the cathode through the polymer electrolyte membrane, and the electrons migrate to an external circuit (load) through a wire (or a current collector). In the cathode of the PEMFC, the proton ions transmitted through the polymer electrolyte membrane and the electrons transmitted from the external circuit through a wire (or a current collector) combine with oxygen, thereby generating water. The migration of electrons via the anode, external circuit, and cathode produces an electric current.

In PEMFCs, the polymer electrolyte membrane acts as an ionic conductor enabling the migration of proton ions from the anode to the cathode and as a separator preventing a mechanical contact between the anode and the cathode. Thus, a high ionic conductivity, high electrochemical stability, a high mechanical strength, high thermal stability at working temperature, easy processibility into a thin film, etc., are required for the polymer electrolyte membrane.

Currently available materials for the polymer electrolyte membrane include polymer electrolytes, such as a perfluorinated sulfonate polymer (for example, NAFION®, which is a registered trade mark of Dupont) having a fluorinated alkylene backbone and fluorinated vinylether side chains having sulfonic acid groups at the terminals thereof. Polymer electrolyte membranes composed of such a polymer electrolyte contain an appropriate amount of water and exhibit high ionic conductivity.

However, the crossover of methanol may be high in such an electrolyte membrane, and the manufacturing cost of the electrolyte membrane is high. Furthermore, the ionic conductivity of the electrolyte membrane decreases significantly at a working temperature of 100° C. or higher due to the loss of water caused by evaporation, and eventually the electrolyte membrane loses its inherent function. Thus, it is almost impossible to operate PEMFCs using such a polymer electrolyte membrane at 100° C. or higher under atmospheric pressure. For this reason, conventional PEMFCs have been operated at temperatures less than 100° C., such as, for example, at a temperature of about 80° C.

In addition, as the ionic conductivity of an electrolyte membrane increases, the water transmission of the electrolyte membrane also increases. However, the increase in water transmission leads to an increase in methanol transmittance. Thus, the requirements for both high ionic conductivity and low methanol transmission cannot be simultaneously satisfied. In other words, in an electrolyte membrane that can pass a predetermined concentration of methanol solution, when the relative amount of water in the methanol solution that can pass the electrolyte membrane with respect to a standard electrolyte membrane (for example, Nafion 115) is 1 or greater, and the relative amount of methanol in the methanol solution that can pass the electrolyte membrane is 1 or less, the electrolyte membrane is useful as a DMFC electrolyte membrane.

To overcome the above-described problems, research into polymer electrolyte membranes as replacements for the NAFION electrolyte membrane is being intensively conducted. As a material for such polymer electrolyte membranes, a block copolymer comprising hydrocarbon repeating units, such as styrene repeating units, ethylene-r-butylene repeating units, isobutylene repeating units, etc., is known.

However, such a block copolymer leads to methanol crossover and serious swelling of the electrolyte membrane, and thus the dimension stability of the membrane and electrolyte assembly (MEA) is poor. In addition, the hydrophobic properties and the mechanical properties of the electrolyte membrane are not so good.

SUMMARY OF THE INVENTION

Aspects of the present invention provide a multiblock copolymer that has a high ionic conductivity, high hydrophobicity, and good mechanical properties and that has various structures to increase selectivity to a solvent used in a polymer electrolyte membrane, a method of preparing the multiblock copolymer, a polymer electrolyte membrane prepared from the multiblock copolymer, and a fuel cell employing the polymer electrolyte membrane.

According to an aspect of the present invention, there is provided a multiblock copolymer comprising: a polysulfone repeating unit of formula (1) below; a sulfonated polysulfone repeating unit of formula (2) below; and a polydialkylsiloxane repeating unit of formula (3) below:

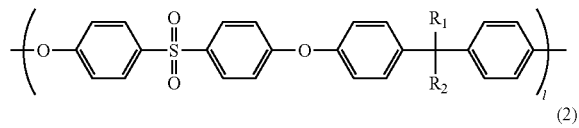

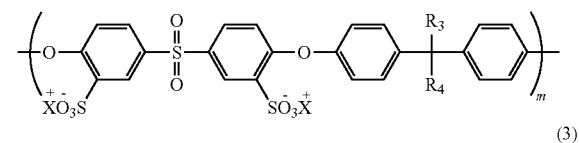

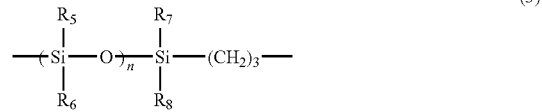

where l, m, and n are integers of 1-200; each of R1 through R8 is independently hydrogen, fluorine, or a C1-C10 alkyl group that can be substituted by at least one fluorine atom; and X represents a tetraalkylamine cation that can be substituted with hydrogen ions or other cations by ion exchange.

According to another aspect of the present invention, there is provided a method of preparing a multiblock copolymer, the method comprising: synthesizing a polymer of formula (4) below having a polysulfone repeating unit and a sulfonated polysulfone repeating unit by polymerizing sulfonate dichlorodiphenyl sulfone (SDCDPS), dichlorodiphenylsulfone, and bisphenol A, wherein l and m are integers of 1-200; reacting the polymer of formula (4) with a tetraalkylammonium hydride and an ethylenic unsaturated compound to substitute an Na+ ion in the polymer with a tetraalkylamine cation and add a reactive group having an ethylenic unsaturated group to a terminal of the polymer; and binding polydialkylsiloxane to the polymer having the ethylenic unsaturated group at its terminal.

According to another aspect of the present invention, there is provided a method of preparing a polymer electrolyte membrane, the method comprising: curing the above-described multiblock copolymer; soaking the cured multiblock copolymer in an acid solution to allow protonation; and washing the protonated multiblock copolymer in deionized water.

According to another aspect of the present invention, there is provided a polymer electrolyte membrane prepared using the above-described method.

According to another aspect of the present invention, there is provided a fuel cell comprising the above-described polymer electrolyte membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
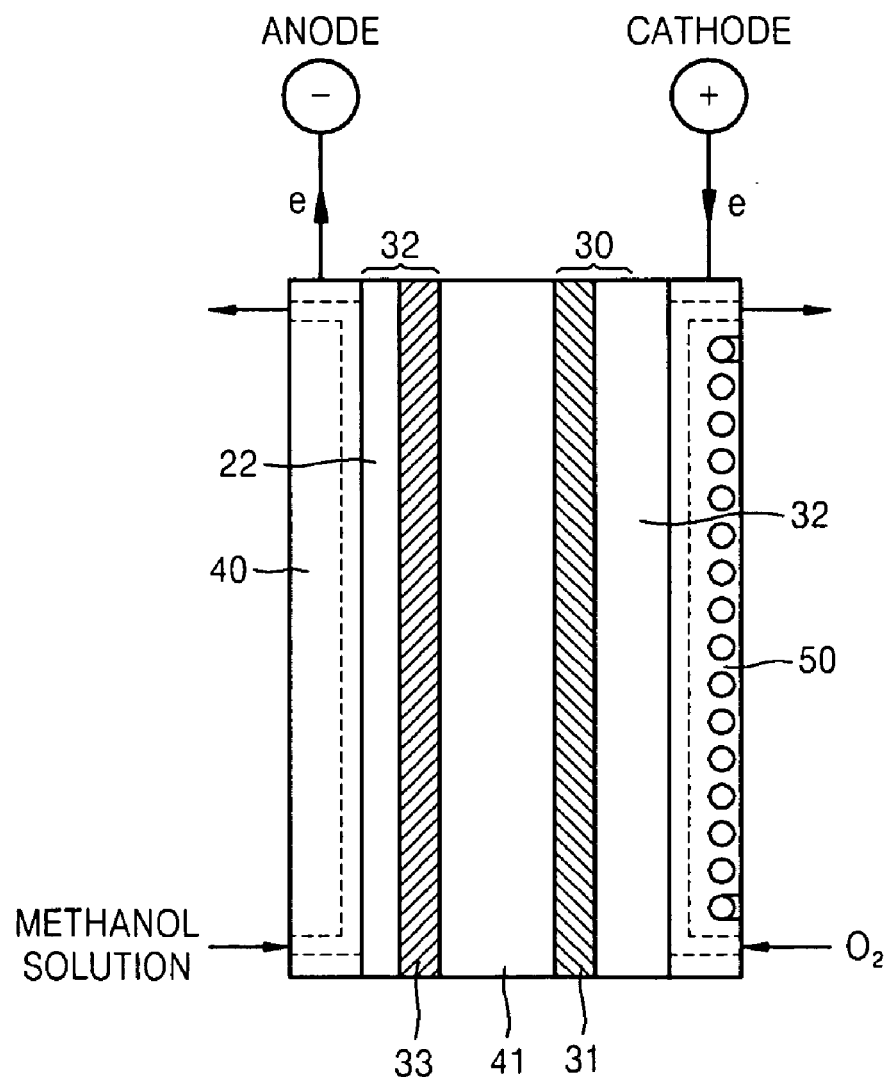
FIG. 1 is a schematic view of a fuel cell including a polymer electrolyte membrane according to an embodiment of the present invention.

Reference will now be made in detail to the present embodiments of the present invention, examples of which are

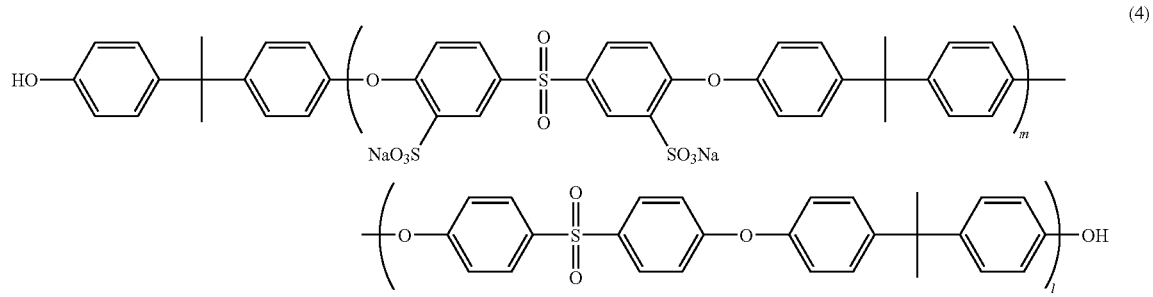

illustrated in the accompanying drawings, wherein like reference numerals refer to the like elements throughout. The embodiments are described below in order to explain the present invention by referring to the figures.

A multiblock copolymer according to an embodiment of the present invention includes three different kinds of repeating units, i.e., a polysulfone repeating unit of formula (1) below, a sulfonated polysulfone repeating unit of formula (2) below, and a polydialkylsiloxane repeating unit of formula (3) below:

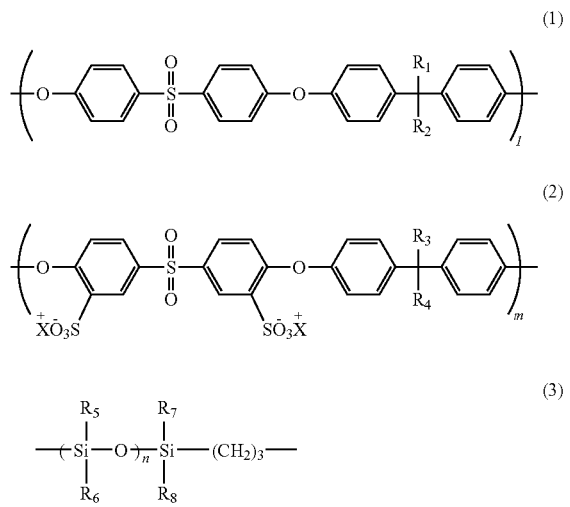

In formulae (1), (2), and (3), l, m, and n are integers of 1-200;

each of $R_1$ through $R_8$ is independently hydrogen, fluorine, or a $C_1$-$C_{10}$ alkyl group that is unsubstituted or substituted by at least one fluorine atom; and X represents a tetraalkylamine cation that can be ion-exchanged for hydrogen ions or other cations.

A multiblock copolymer according to aspects of the present invention includes a rigid polysulfone repeating unit (hereinafter, also referred to as "rigid block Ri"), a sulfonated polysulfone repeating unit (hereinafter, also referred to as "sulfonated block S") that can form an ionic channel, and a dialkylsixolane repeating unit (hereinafter, also referred to as "rubbery block Ru") that is flexible, unlike the rigid block Ri and the sulfonated block S, which are easy to break, and that improves the hydrophobic and mechanical properties of the multiblock copolymer. Thus, the multiblock copolymer has high ionic conductivity, high hydrophobicity, and good mechanical properties. In addition, the structure of the multiblock copolymer can be varied by appropriately combining the repeating units to increase the selectivity to a solvent that is used when manufacturing a polymer electrolyte membrane.

The tetraalkylamine cation may include a $C_1$-$C_{10}$ alkyl group that is unsubstituted or substituted by at least one fluorine atom.

In the multiblock copolymer according to aspects of the present invention, the number of polysulfone repeating units and the number of sulfonated polysulfone repeating units may be in a range of 1-200.

The ratio of the repeating units can be varied to obtain desired physical properties. For example, the ratio of l, m, and n may be in a range of 100:20-80:1-20. Nanostructures having various shapes and sizes can be formed according to the ratio between the polysulfone repeating units, the sulfonated polysulfone repeating units, and the dialkylsiloxane repeating units, the molecular weight of the polymer, etc. For example, a cylindrical nanostructure, a layered nanostructure, etc., can be formed.

As a non-limiting example, the multiblock copolymer may have a weight average molecular weight of 2,000-100,000.

A multiblock copolymer according to aspects of the present invention may have three structures as follows according to the combination of the Ri, S, and Ru blocks.

i) (Ri+S) Random Blocks and Ru Block

Ri repeating units and S repeating units are randomly arranged to form (Ri+S) random blocks, which are connected by an Ru block consisting of Ru repeating units. This structure is schematically illustrated as below:

(RiRiRi-S-Ri-SS-RiRi . . . )-(RuRuRu . . . )-(Ri-SSS-RiRi-S-Ri . . . )- ii) Ri Block+Ru Block+S Block

An Ri block consisting of Ri repeating units, an Ru block consisting of Ru repeating units, and an S block consisting of S repeating units are connected in series. This pattern is repeated. This structure is schematically illustrated as below:

(RiRiRi . . . )-(RuRuRu . . . )—(SSS . . . )— iii) Ri Block+S Block+Ru Block

An Ri block consisting of Ri repeating units, an S block consisting of S repeating units, and an Ru block consisting of Ru repeating units are connected in series. This pattern is repeated. This structure is schematically illustrated as follows:

(RiRiRi . . . )-(SSS . . . )—(RuRuRu . . . )—

However, it is to be understood that other structures based on other combinations of polysulfone, sulfonated polysulfone and dialkylsiloxane repeating units are possible.

Aspects of the present invention also provide a method of preparing a multiblock copolymer, the method comprising: synthesizing a polymer of formula (4) below having a polysulfone repeating unit and a sulfonated polysulfone repeating unit by polymerizing disulfonate dichlorodiphenylsulfone (SDCDPS), dichlorodiphenylsulfone, and bisphenol A, wherein l and m are integers of 1-200;

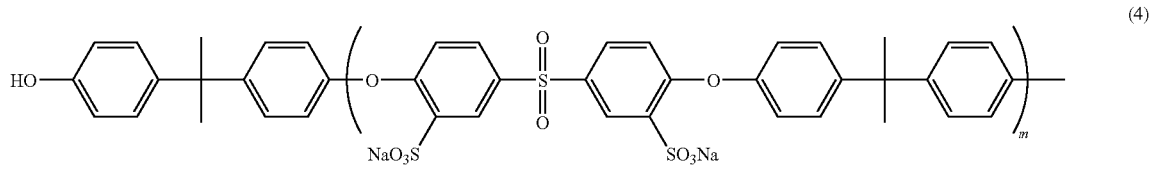

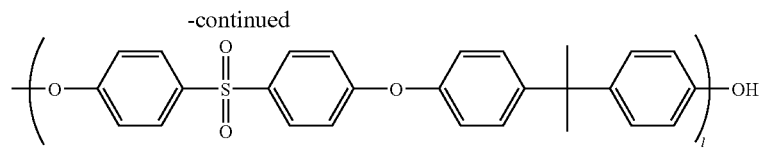

reacting the polymer of formula (4) with a tetraalkylammonium hydride and an ethylenic unsaturated compound to replace the $Na^+$ ion in the polymer with a tetraalkylamine cation and add a reactive group having an ethylenic unsaturated group to a terminal end of the polymer; and binding a polydialkylsiloxane to the polymer by way of the ethylenic unsaturated group at its terminal.

In the method of preparing a multiblock copolymer according to an aspect of the present invention, initially, disulfonate dichlorodiphenylsulfone (SDCDPS), dichlorodiphenylsulfone, and bisphenol A are polymerized in a solvent such as toluene, butanol, dimethylacetamide, dimethylsulfoxide, a mixture thereof, etc., in the presence of $K_2CO_3$ to prepare a polymer having a polysulfone block Ri and a sulfonated polysulfone block S. This reaction is illustrated in Reaction Scheme (1) below. For example, the reaction can be performed at 170° C. for 4 hours, at 160° C. for 48 hours, and then at 160° C. for 24 hours.

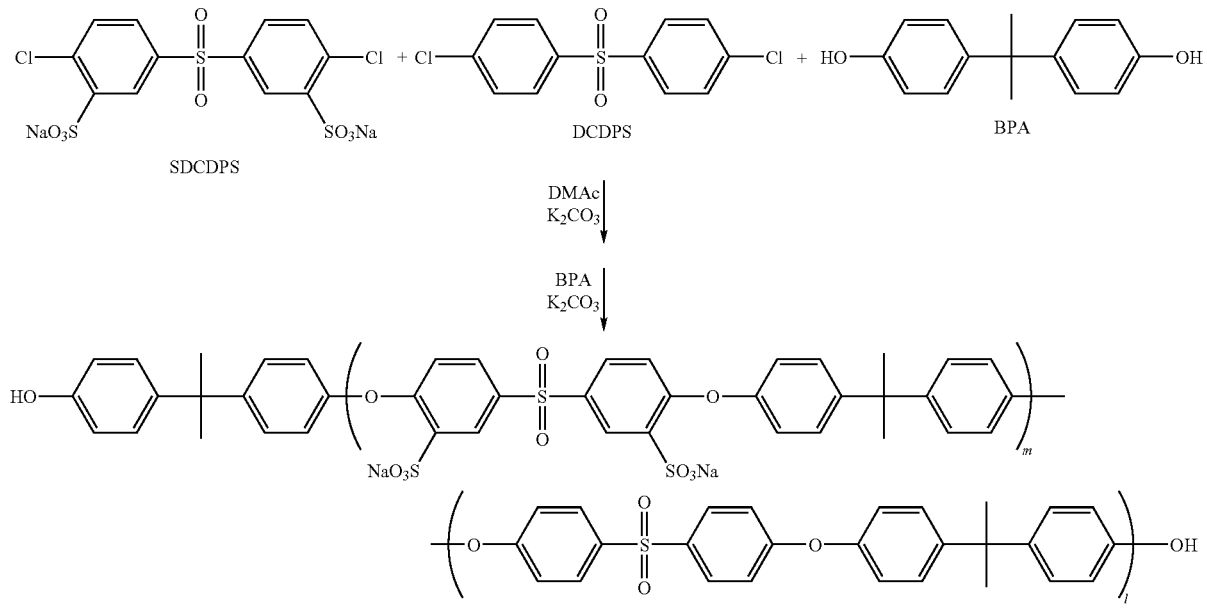

Next, the polymer prepared according to Reaction Scheme (1) is reacted with a tetraalkylammonium hydride (specifically, tetrabutylammonium hydride in Reaction Scheme (2)) and an ethylenic unsaturated compound (specifically, allylchloride in Reaction Scheme (2)) in a solvent such as chlorobenzene, to replace the $Na^+$ ion in the polymer with a tetraalkylamine cation and add an ethylenic unsaturated group to a terminal of the polymer. This allylation reaction is illustrated in Reaction Scheme (2) below. This reaction may be performed in a sodium hydroxide solution having a concentration of about 12.5 N.

Reaction Scheme (2)

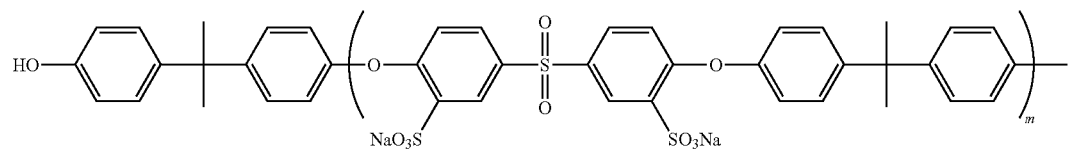

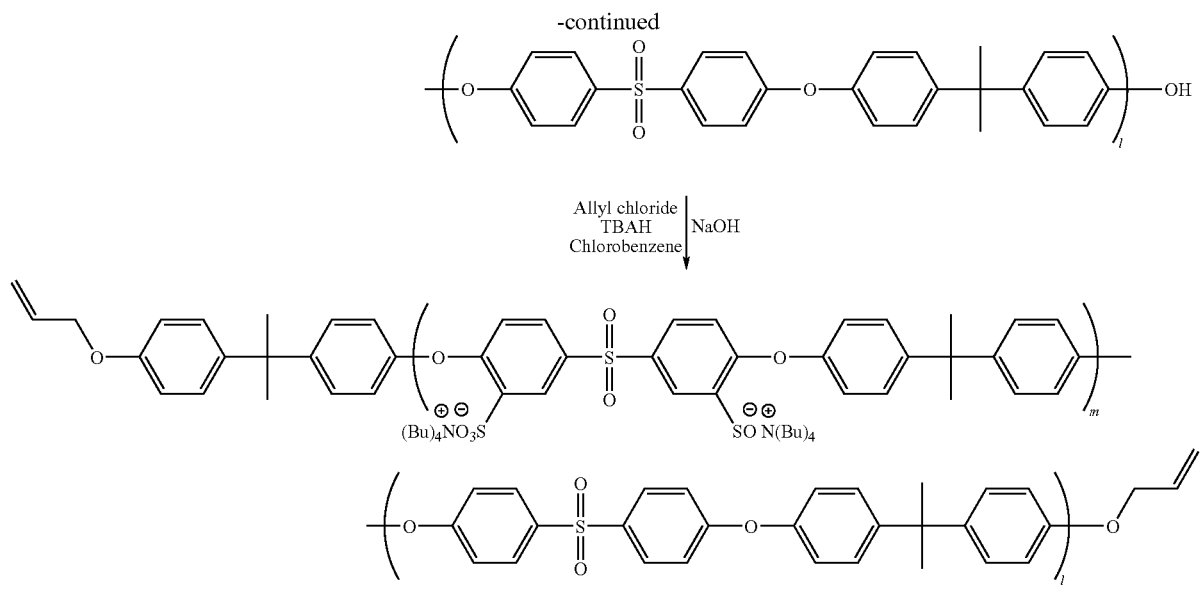

A multiblock copolymer having a -(Bu)$_4$N$^+$ group and that is the reaction product in Reaction Scheme 2, may dissolved in a solvent in a process of manufacturing a polymer electrolyte membrane. The polymer electrolyte membrane may then be used in a fuel cell after the -(Bu)$_4$N$^+$ group in the polymer electrolyte membrane is substituted by H$^+$.

When 4-vinylbenzyl chloride is used instead of allylchloride for allylation in Reaction Scheme 2, a multiblock copolymer of formula (5) below can be obtained.

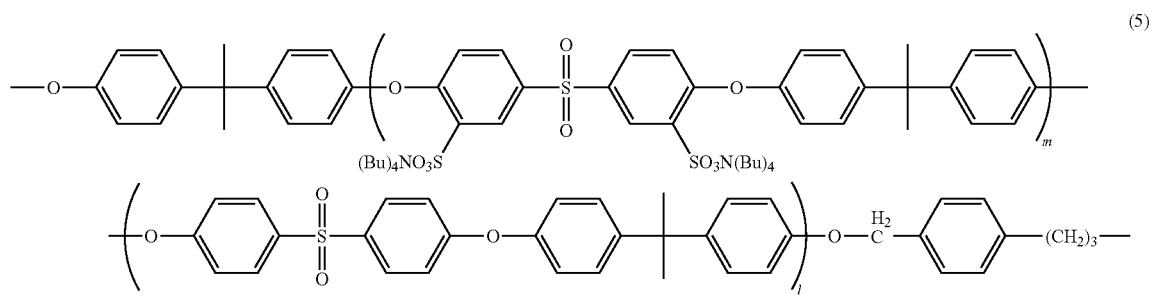

Finally, polydimethylsiloxane is bound to the polymer having the ethylenic unsaturated group, which is obtained according to Reaction Scheme (2), by hydrosilylation to obtain a multiblock copolymer according to aspects of the present invention, as illustrated in Reaction Scheme (3).

Reaction Scheme (3)

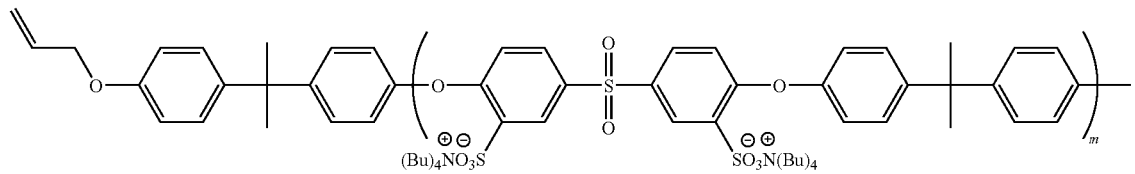

-continued

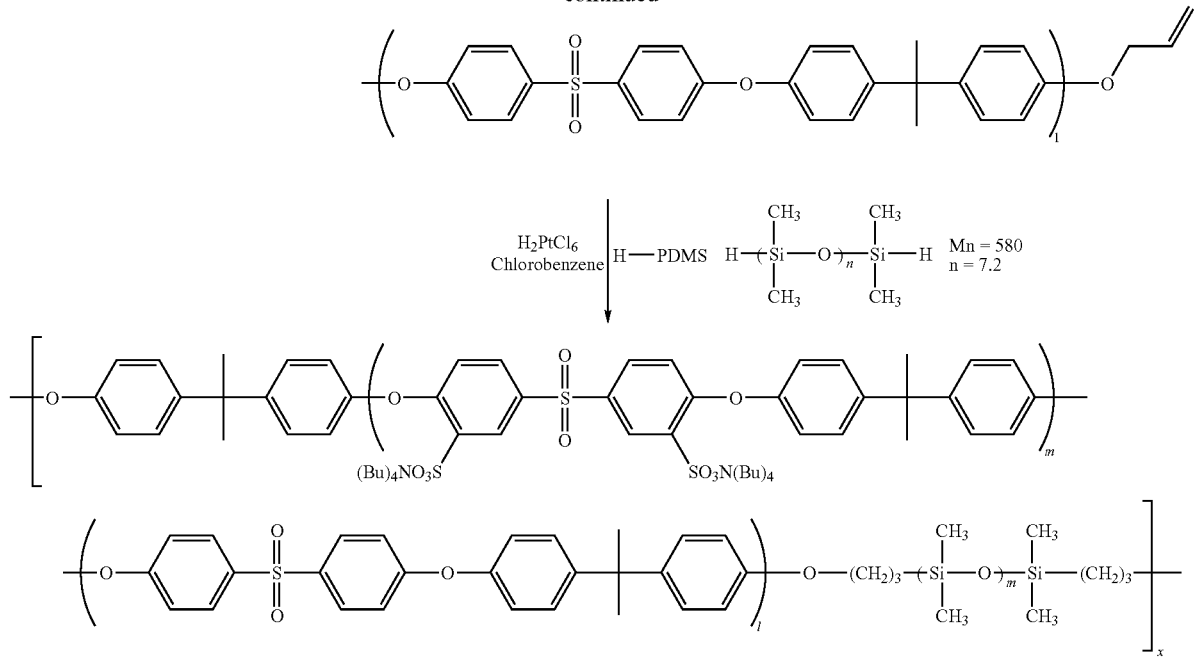

When 4-vinylbenzyl chloride, instead of allylchloride used in the allylation reaction in Reaction Scheme (2), is used, a multiblock copolymer of formula (6) below can be synthesized.

(6)

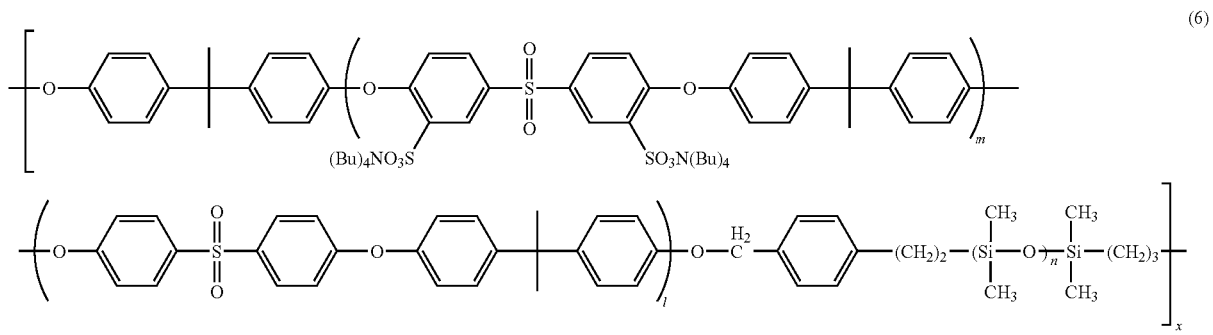

Although a method of synthesizing the multiblock copolymer having the structure i) including (Ri+S) random blocks and Ru blocks is described above as an embodiment, multiblock copolymers having the structure ii) including a Ri block+Ru block+S block and having the structures iii) including a Ri block+S block+Ru block can be synthesized in the same manner as described above by controlling the composition of the polymerization reactants, the sequence of polymerization, etc.

Aspects of the present invention also provide a method of preparing a polymer electrolyte membrane, the method comprising: curing the above-described multiblock copolymer; soaking the cured multiblock polymer in an acid solution to allow protonation; and washing the protonated multiblock polymer in deionized water.

The curing may be performed at a temperature of 180-220° C. for 30 minutes-6 hours, for example.

When the curing temperature is lower than 180° C., the multiblock copolymer may not cure. When the curing temperature is higher than 220° C., a thermal energy may be lost due to the high-temperature process. When the curing time is shorter than 30 minutes, the curing may be insufficient. When the curing time is longer than 6 hours, the curing time may be unnecessarily long.

Next, the cured multiblock copolymer is soaked in an acid solution for protonation. Through this protonation, the tetraalkylamine cation of the cured multiblock copolymer is substituted by H.

The acid solution can be an acid solution, such as, for example, a sulfuric acid solution or hydrochloric acid solution, having a concentration of 1.0-2.0 M. For example, the cured multiblock copolymer may be soaked in an acid solution having a temperature of 70-90° C. for 3-5 hours. When the temperature of the acid solution is lower than 70° C., the time spent in the protonation is unnecessarily long. When the soaking time is shorter than 3 hours, the protonation may be insufficient.

Finally, the protonated product is washed in deionized water and dried, thereby resulting in a polymer electrolyte membrane according to an embodiment of the present invention.

Aspects of the present invention provide a polymer electrolyte membrane prepared using the above-described method.

The multiblock copolymer according to aspects of the present invention has a high ionic conductivity and good hydrophobicity and mechanical properties. The structure of the multiblock copolymer can be varied to increase the selectivity to a solvent used in a polymer electrolyte membrane. Furthermore, an average sales price of conventional electrolyte membranes, such as NAFION 112, etc., used in fuel cells is typically about 550 US$ per $m^2$, while the price of the electrolyte membrane having higher performance according to aspects of the present invention is typically only about 100 US$ per $m^2$ (2006 price estimates).

Aspects of the present invention provide a fuel cell including the polymer electrolyte membrane. The fuel cell according to aspects of the present invention includes a cathode, an anode, and the polymer electrolyte membrane interposed between the cathode and the anode.

Each of the cathode and the anode includes a gas diffusion layer and a catalyst layer. The catalyst layer contains a metallic catalyst to catalyze reactions in the fuel cell, such as oxidation of hydrogen and reduction of oxygen. For example, the catalyst layer may contain at least one catalyst selected from among Pt, Ru, Os, a Pt—Os alloy, a Pt—Pd alloy, and a Pt-M alloy where M is at least one transition metal selected from among Ga, Ti, V, Cr, Mn, Fe, Co, Ni, Cu, and Zn. In a specific, non-limiting embodiment of the present invention, the catalyst layer may contain at least one catalyst selected from among Pt, Ru, Os, a Pt—Ru alloy, a Pt—Os alloy, a Pt—Pd alloy, a Pt—Co alloy, and a Pt—Ni alloy.

In general, the metal catalyst can be a supported catalyst. A support for the supported catalyst can be carbon, such as acetylene black, graphite, etc., or inorganic fine particles, such as alumina, silica, etc. In addition, any commercially available supported-precious metal or a supported-precious metal prepared by infiltrating a precious metal into a support can be used as the metal catalyst.

Carbon paper or carbon cloth can be used for the gas diffusion layer. However, examples of materials for the gas diffusion layer are not limited thereto. The gas diffusion layer supports the electrodes of the fuel cell and diffuses a reaction gas into the catalyst layer to allow the reaction gas to easily access the catalyst layer. A gas diffusion layer obtained by treating carbon paper or carbon cloth with a fluorine-based resin, such as polytetrafluoroethylene, to be waterproof may be used to prevent a decrease in gas diffusion efficiency due to the generation of water during the operation of the fuel cell.

The electrodes may further include a microporous layer between the gas diffusion layer and the catalyst layer to enhance the gas diffusion effect of the gas diffusion layer. The microporous layer may be formed using a composition containing a conductive material, such as carbon powder, carbon black, active carbon, acetylene black, etc., and a binder, such as polytetrafluoroethylene, through a coating process. The composition may further contain an ionomer, if required.

The fuel cell according to an aspect of the present invention may be a DMFC.

Hereinafter, according to an aspect of the present invention, a DMFC as an example of a fuel cell using the polymer electrolyte membrane described above will be described with reference to FIG. 1.

Referring to FIG. 1, a DMFC according to an embodiment of the present invention includes an anode 32 to which fuel is supplied, a cathode 30 to which an oxidant is supplied, and an electrolyte membrane 41 interposed between the anode 32 and the cathode 30. In general, the anode 32 includes an anode diffusion layer 22 and an anode catalyst layer 33. The cathode 30 includes a cathode diffusion layer 32 and a cathode catalyst layer 31.

A methanol solution enters the catalyst layer 33 of the anode 32 through the diffusion layer 22 decomposes into electrons, protons, carbon dioxide, etc. The protons migrate to the cathode catalyst layer 31 through the electrolyte membrane 41, the electrons are transported to an external circuit, and the carbon dioxide is externally exhausted. In the cathode catalyst layer 31, the proton ions transported through the electrolyte membrane 41, electrons supplied from an external circuit, and oxygen in air supplied through the cathode diffusion layer 32 react together to produce water.

Hereinafter, the present invention will be described in greater detail with reference to the following examples. The following examples are for illustrative purposes only and are not intended to limit the scope of the invention.

EXAMPLE 1

Preparation of Multiblock Copolymer

EXAMPLE 1-1

Polymerization of Polysulfone Block and Sulfonated Polysulfone Block 4.9 g of disulfonate dichlorodiphenyl sulfone dried at 70° C., 2.87 g of dichlorodiphenylsulfone, 4.56 g of bisphenol-A, 11.04 g of $K_2CO_3$ (80 mmol), 60 mL of purified dimethylacetamide, 30 mL of toluene were put into a 250 mL, 3-neck flask in a nitrogen atmosphere and reacted at 170° C. for 4 hours for dehydration. After the reaction product was further reacted at 160° C. for 48 hours, 0.456 g of bisphenol-A, and 31.104 g of $K_2CO_3$ were added to the reaction product and maintained at 160° C. for 24 hours to hydroxylate terminal groups. The reaction solution was precipitated with isopropyl alcohol to obtain a solid. The solid was vacuum dried at 70° C. The dried solid was pulverized, desalted with distilled water, filtered, and then vacuum-dried at 70° C. to obtain an oligo-sulfone.

Figure 2:
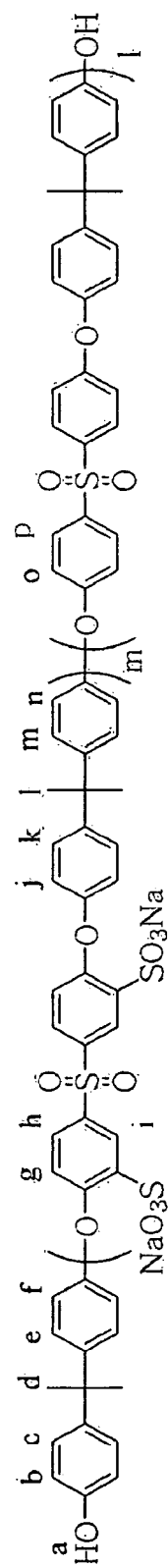
FIG. 2 is the result of $^1$H-NMR spectroscopy on a multiblock copolymer including a polysulfone block and a sulfonated polysulfone block prepared in Example 1.
Figure 2:
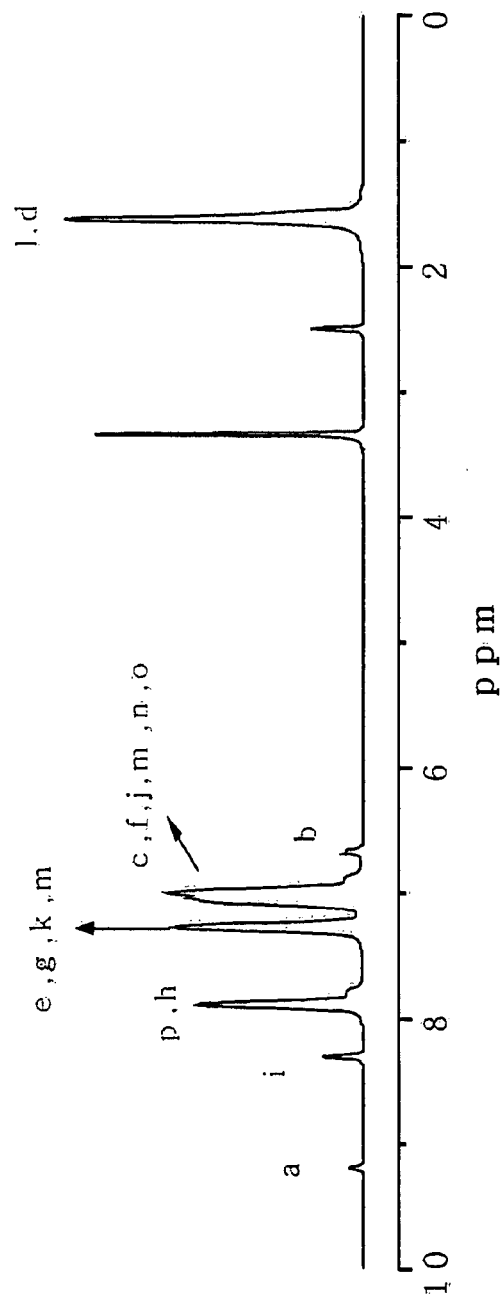

FIG. 2 shows the result of 1H-NMR spectroscopy on the polymer synthesized above, and Table 1 shows the molecular weights of oligo-sulfones, the number of polysulfone repeating units and sulfonated polysulfone repeating units in various synthesized oligo-sulfones, the mole % of disulfonate dichlorodiphenyl sulfone in the used monomers, and the mole % of disulfonate dichlorodiphenyl sulfone in the synthesized polymer.

TABLE 1

| Polymer System | Molecular Weight[a] (g/mol) | l + m[b] | Mole % of disulfonate dichlorodiphenyl sulfone in the used monomer | Mole % of disulfonate dichlorodiphenylsulfone in the synthesized polymer[c] |
|---|---|---|---|---|
| OHPSF-20 | 6451 | 12-13 | 20 | 18 |
| OHPSF-30 | 4232 | 8-9 | 30 | 21 |
| OHPSF-40 | 4343 | 7-8 | 40 | 40 |
| OHPSF-50 | 6358 | 11-12 | 50 | 48 |

[a] and [b] were calculated based on 1H-NMR spectra
[c] = l/(l + m) × 100 (%)
(OHPSF-20, OHPSF-30, OHPSF-40, and OHPSF-40 indicate polymer systems containing 20 mole %, 30 mole %, 40 mole %, and 50 mole % of disulfonate dichlorodiphenyl sulfone, respectively, based on the total amount of disulfonate dichlorodiphenyl sulfone and dichlorodiphenylsulfone.)

TABLE 2

| Polymer System | Molecular Weight[a] (g/mol) | l + m[b] | Mole % of disulfonate dichlorodiphenyl sulfone in synthesized polymer |
|---|---|---|---|
| AEPSF-20 | 8973 | 15-16 | 22 |
| AEPSF-30 | 6344 | 10-11 | 27 |
| AEPSF-40 | 5374 | 9-10 | 36 |
| AEPSF-50 | 10502 | 13-14 | 60 |

[a] and [b] were calculated based on 1H-NMR spectra
[c] = l/(l + m) × 100 (%)
(AEPSF-20, AEPSF-30, AEPSF-40, and AEPSF-50 indicate polymer systems containing 20 mole %, 30 mole %, 40 mole %, and 50 mole % of allylated disulfonate dichlorodiphenyl sulfone, respectively, based on the total amount of allylated disulfonate dichlorodiphenyl sulfone and dichlorodiphenylsulfone.)

EXAMPLE 1-2

Addition of Reactive Group Including Ethylenic Unsaturated Group to Terminals of Polymer Synthesized in Example 1-1

7 g of the oligo-sulfone synthesized in Example 1-1, 8.25 g of tetrabutyl ammonium hydrogen sulfate, 50 mL of chlorobenzene, 8 mL of allylchloride, and 8 mL of 12.5N-sodium hydroxide were put into a 250 mL, 2-neck flask and vigorously stirred for 24 hours. The organic phase was separated from the reaction mixture and precipitated in n-hexane. The n-hexane was removed, and the precipitate was vacuum-dried at 70° C. and washed with distilled water. Finally, the distilled water was removed through filtration, and the resulting product was vacuum-dried at 70° C. The solid materials did not dissolve well at an early stage of the reaction but became soluble as Na was substituted by ($Bu_4N$). The solubility of the solid materials was lower when a larger amount of disulfonate dichlorophenyl sulfone was used.

Figure 3:
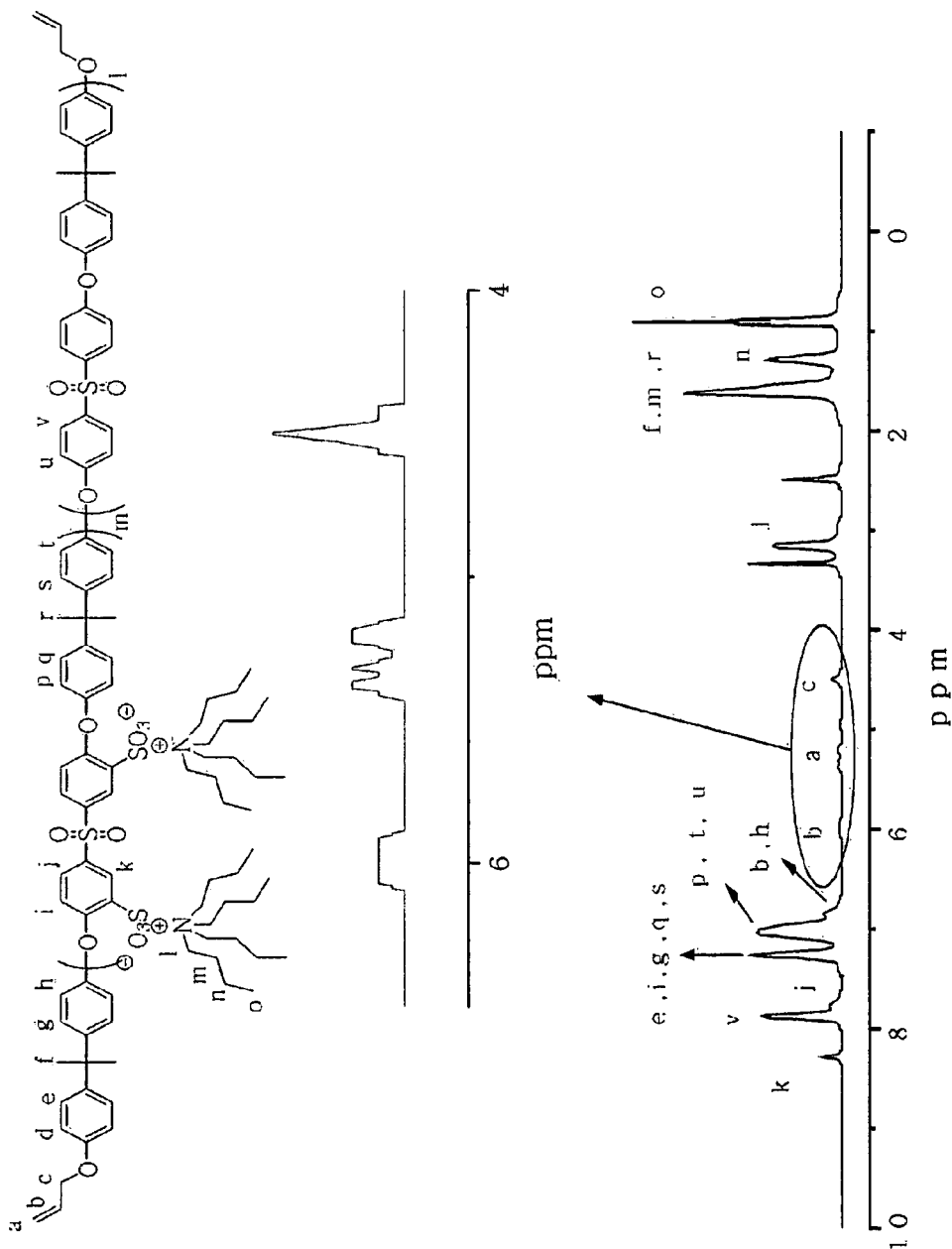
FIG. 3 is the result of $^1$H-NMR spectroscopy on an allylated multiblock copolymer including a polysulfone block and a sulfonated polysulfone block prepared in Example 1.

FIG. 3 shows the result of 1H-NMR spectroscopy on the allylated oligo-sulfone synthesized above, and Table 2 shows the molecular weights of oligo-sulfones, the number of the polysulfone repeating units and the sulfonated polysulfone repeating units in various synthesized oligo-sulfones, and mole % of disulfonate dichlorodiphenyl sulfone in the synthesized polymer.

EXAMPLE 1-3

Block Copolymerization (Binding of Polydimethylsiloxane)

1 g of the allylated oligo-sulfone synthesized in Example 1-2 and 20 mL of chlorobenzene were put into a 50 m, 3-neck flask (Din-stark apparatus) and heated to 140° C. in order to remove water from the solvent. After 4 hours, the reaction composition was cooled to 90° C., and 0.1 ml of $H_2PtCl_6$ (2% isopropanol solution) was added and heated to 130° C. 1 equivalent of polydimethylsiloxane (M.W.: 580 g) was added using a syringe and reacted for 24 hours. Finally, the reaction solution was precipitated using diethylether to precipitate unreacted polydimethylsiloxane and vacuum dried at 40° C. to obtain a multiblock copolymer having formula (7) according to an aspect of the present invention.

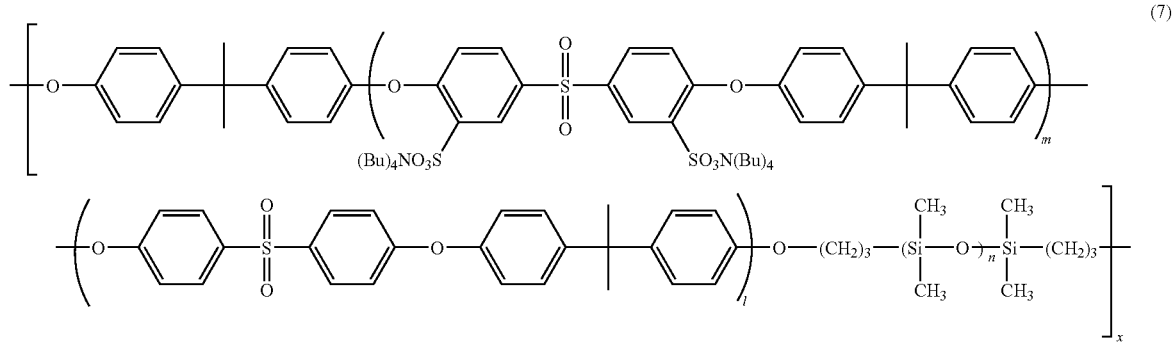

(7)

where l=15, m=15, n=7, and x=10.

Figure 4:
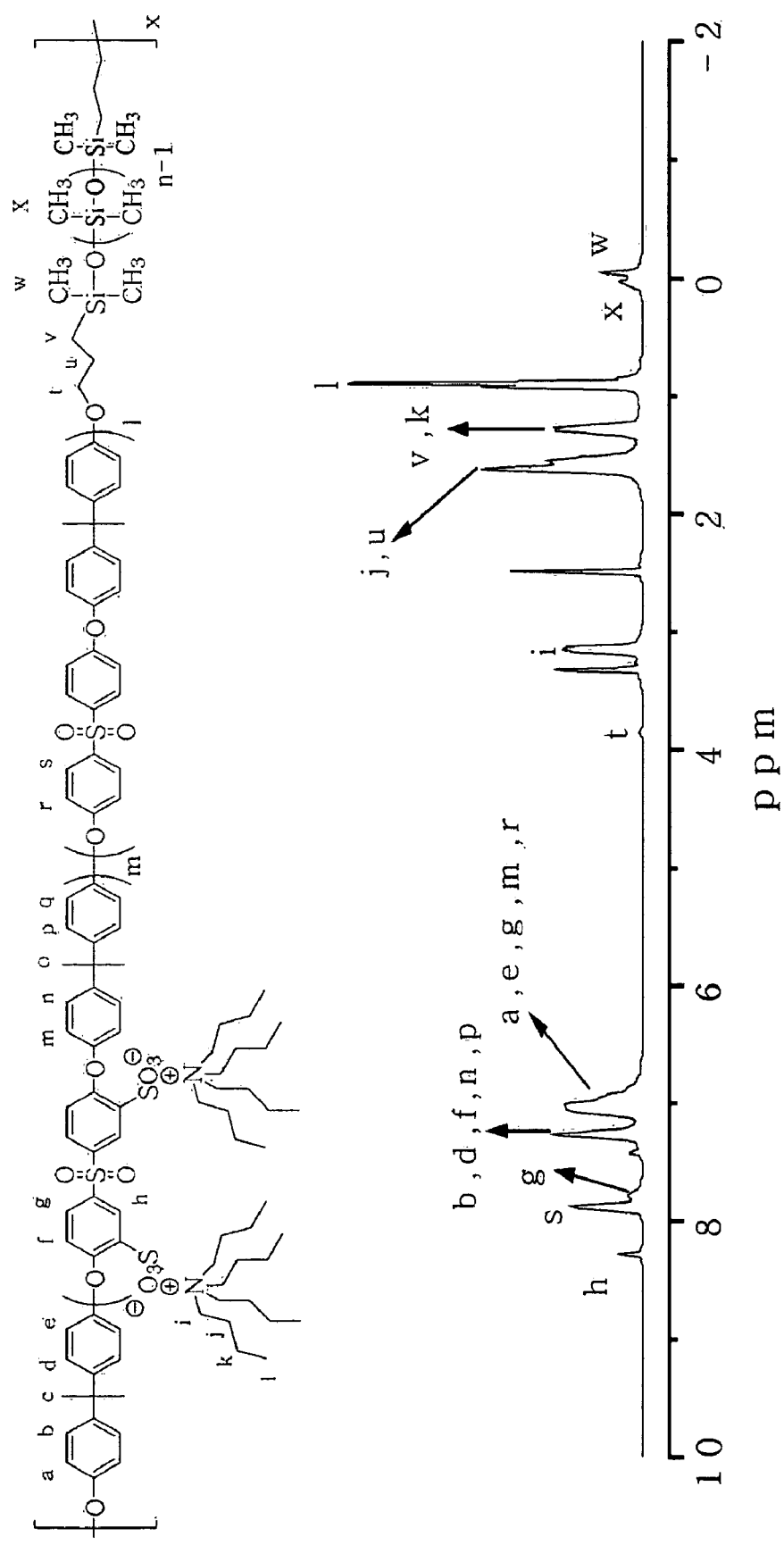
FIG. 4 is the result of $^1$H-NMR spectroscopy on a multiblock copolymer prepared in Example 1.

FIG. 4 shows the result of $^1$H-NMR spectroscopy on the synthesized multiblock copolymer.

EXAMPLE 2

Manufacture of Polymer Electrolyte Membrane

The multiblock copolymer obtained in Example 1 was thermally cured at 200° C. for 3 hours. Next, the cured multiblock copolymer was soaked in 1.5M-$H_2SO_4$ solution at 80° C. for 4 hours to allow protonation. The protonated product was washed in deionized water and dried to obtain a polymer electrolyte membrane having a thickness of 100 μm.

Figure 5:
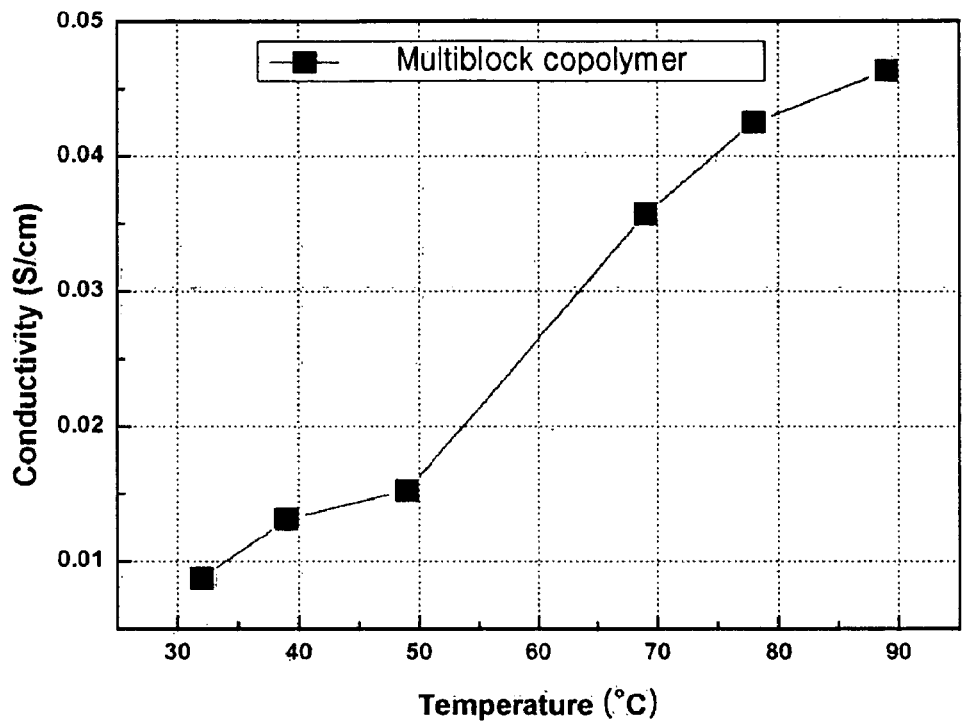
FIG. 5 is a graph of ionic conductivity of a polymer electrolyte membrane prepared in Example 2 with respect to temperature.

FIG. 5 is a graph of the ionic conductivity of the polymer electrolyte membrane (polysulfone repeating unit: sulfonated polysulfone repeating unit: polydimethylsiloxane repeating unit=5:5:2.5) with respect to temperature. As is apparent from the results in FIG. 5, the polymer electrolyte membrane containing a multiblock copolymer according to an aspect of the present invention has high ionic conductivities at temperatures ranging from 30° C. to 60° C.

Figure 6:
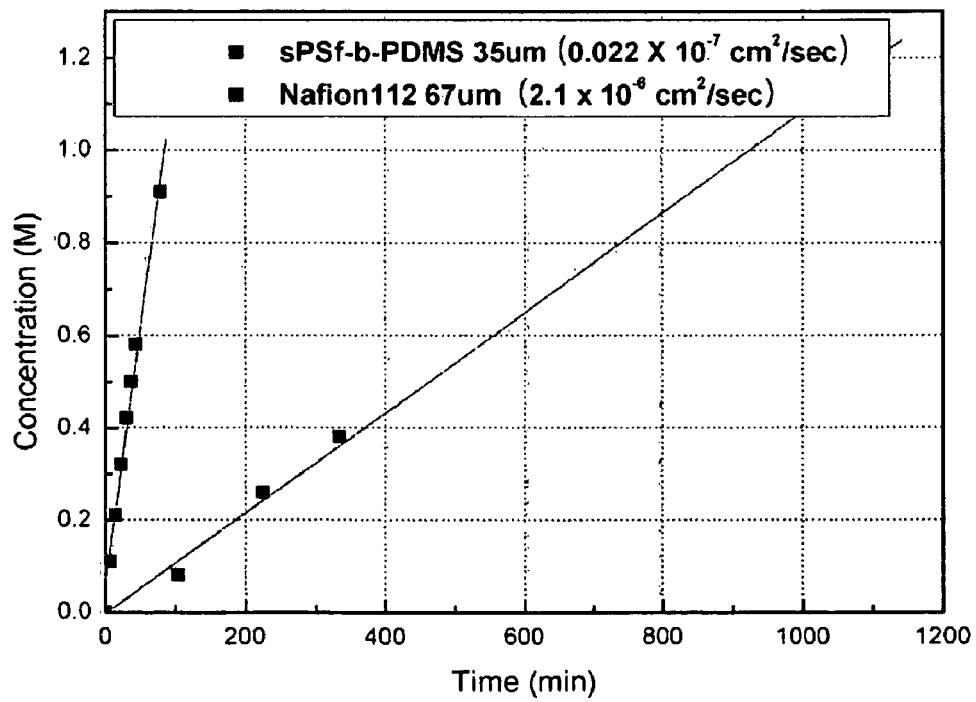
FIG. 6 is a graph showing the crossover of methanol in the polymer electrolyte membrane prepared in Example 2 with respect to temperature

FIG. 6 is a graph illustrating the crossover of methanol in the polymer electrolyte membrane (polysulfone repeating unit: sulfonated polysulfone repeating unit: polydimethylsiloxane repeating unit=5:5:2.5) with respect to time. As is apparent from the results in FIG. 6, the crossover of methanol in the polymer electrolyte membrane including the multiblock copolymer according to an aspect of the present invention is about 11% of the cross of methanol in NAFION 112, which is a common electrolyte membrane.

As described above, according to aspects of the present invention, a multiblock copolymer that has a high ionic conductivity, high hydrophobicity, and good mechanical properties and that can have various structures to increase selectivity to a solvent used in a polymer electrolyte membrane can be prepared at a low cost.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A multiblock copolymer comprising:
a polysulfone repeating unit of formula (1) below;
a sulfonated polysulfone repeating unit of formula (2) below; and
a polydialkylsiloxane repeating unit of formula (3) below:

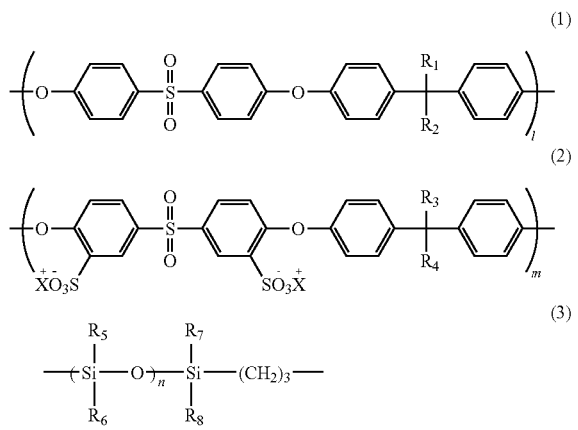

where l, m, and n are integers of 1-200; each of $R_1$ through $R_8$ is independently hydrogen, fluorine, or a $C_1$-$C_{10}$ alkyl group that can be substituted by at least one fluorine atom; and X represents a tetraalkylamine cation that can be ion-exchanged for hydrogen ions or other cations.

2. The multiblock copolymer of claim 1, wherein the tetraalkylamine cation includes a $C_1$-$C_{10}$ alkyl group that is unsubstituted or substituted by at least one fluorine atom.

3. The multiblock copolymer of claim 1, wherein the ratio of l, m, and n is in a range of 100:20-80:1-20.

4. The multiblock copolymer of claim 1, wherein the multiblock copolymer has a weight average molecular weight of 2,000-100,000.

5. The multiblock copolymer of claim 1, having a structure in which blocks consisting of randomly arranged polysulfone repeating units and sulfonate polysulfone are connected by blocks consisting of polydialkylsiloxane repeating units.

6. The multiblock copolymer of claim 1, having a structure in which a block consisting of polysulfone repeating units and a block consisting of sulfonated polysulfone repeating units are connected by a block consisting of polydialkylsiloxane repeating units.

7. The multiblock copolymer of claim 1, having a structure in which a block consisting of polysulfone repeating units and a block consisting of polydialkylsiloxane repeating units are connected by a block consisting of sulfonated polysulfone repeating units.

8. The multiblock copolymer of claim 1, wherein ion conductivity, hydrophobicity, mechanical properties and/or selectivity to a solvent of the multiblock copolymer are selected by selecting a ratio of the polysulfone repeating unit, the sulfonated polysulfone repeating unit and the polydialkylsiloxane in the multiblock polymer.

9. A method of preparing a multiblock copolymer comprising polymerizing:
a polysulfone repeating unit of formula (1) below;
a sulfonated polysulfone repeating unit of formula (2) below; and
a polydialkylsiloxane repeating unit of formula (3) below:

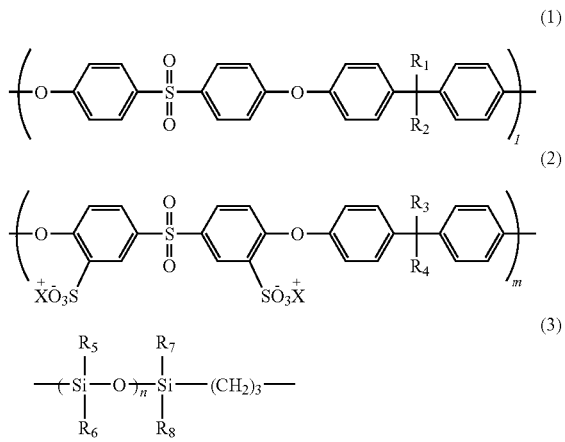

where l, m, and n are integers of 1-200; each of $R_1$ through $R_8$ is independently hydrogen, fluorine, or a $C_1$-$C_{10}$ alkyl group that can be substituted by at least one fluorine atom; and X represents a tetraalkylamine cation that can be ion-exchanged for hydrogen ions or other cations.

10. The method of claim 9, wherein ion conductivity, hydrophobicity, mechanical properties and/or selectivity to a solvent of the multiblock copolymer are selected by controlling a ratio of the polysulfone repeating unit, the sulfonated polysulfone repeating unit and the polydialkylsiloxane in the polymerizing.

11. The method of claim 9, wherein a structure of the multiblock copolymer is controlled by controlling a sequence of polymerizing.

* * * * *